United States Patent [19]

Dillon

[11] Patent Number: 5,331,724
[45] Date of Patent: Jul. 26, 1994

[54] MAIN LINE TOGGLE

[75] Inventor: James W. Dillon, Quesnel, Canada

[73] Assignee: Baker Cable Ltd., Prince George, Canada

[21] Appl. No.: 120,697

[22] Filed: Sep. 13, 1993

Related U.S. Application Data

[63] Continuation of Ser. No. 868,884, Apr. 16, 1992, abandoned.

[51] Int. Cl.⁵ .............................................. A44B 11/25
[52] U.S. Cl. .................................. 24/114.5; 414/569; 403/315; 403/316
[58] Field of Search ................................ 414/751, 569; 294/82.14; 212/116, 118, 122; 403/104, 315, 316, 377; 24/72.7, 114.5, 115 A, 683; 43/44.9, 44.87, 44.91, 44.97

[56] References Cited

U.S. PATENT DOCUMENTS 2,637,591  5/1953  Maxfield et al. ............. 294/82.14 X
3,844,601 10/1974  Rochester, Jr. .................. 294/82.14
3,914,825 10/1975  Reynolds ......................... 24/114.5 X Primary Examiner—Michael S. Huppert
Assistant Examiner—Donald W. Underwood
Attorney, Agent, or Firm—John R. Uren; Elbie R. de Kock

[57] ABSTRACT

Toggle apparatus for attachment to a tractor (10) or other pulling device having a main line cable (12) for attachment to the pulling device (10), a stopper (20) on the cable (12) and a toggle (22) which is retained on the cable (12) by the stopper (20). The stopper (20) is dimensioned to allow the passage thereover of slider rings (16) for the removal or mounting of the slider rings (16) from or onto the cable (12). The toggle (22) is dimensioned to retain the slider rings (16) against the stopper (20) on the cable (12). The toggle (22) is movable into a position in which it is in alignment with the cable (12) to permit the slider rings (16) to pass over the toggle (22) in the aligned position for removal of the slider rings (16) from the cable (12).

3 Claims, 3 Drawing Sheets

MAIN LINE TOGGLE

This application is a continuation of U.S. Pat. application Ser. No. 07/868,884, filed Apr. 16, 1992, now abandoned.

FIELD OF THE INVENTION

This invention relates to a toggle apparatus which is suitable for use in the transportation of logs in logging operations.

BACKGROUND OF THE INVENTION

In logging, a main line cable is connected to a tractor or other pulling device for use in transporting logs. Logs are transported by means of choke cables or chokers which attach around the logs and are connected to the main line by means of slider rings on the main line. A slider ring is provided for each choker cable and it has an eye thereon to which the choker cable is attached by splicing. A plurality of such slider rings, each attached to a choker cable, is located on the main line. A knob is attached to the end of the main line to retain the slider rings on the main line. The retaining knob has a diameter which is larger than the inside diameter of the sliding rings, so that the rings, which are placed on the main line prior to attaching the retaining knob, cannot come off the main line over the knob during operation. The knob is secured to the main line cable by driving wedges into the end of the cable, thereby to expand the cable against the tapered internal dimension of the knob.

The disadvantage of the known system is that it is not possible to remove the slider rings from the main line without removing the retainer knob. This means either cutting the main line cable before the knob or by otherwise removing the knob itself. If, for example, a choker cable breaks, a new choke cable cannot be attached without down time for the main line because the choker cable needs to be spliced once again to its slider ring or else the retainer knob must be removed, which is difficult and time consuming. In addition, if a choker cable is broken, it can create a dangerous operating condition if it is not promptly removed.

It is accordingly an object of the present invention to alleviate the above difficulties.

SUMMARY OF THE INVENTION

According to one embodiment of the invention, there is provided logging apparatus for attachment to a tractor or other pulling means, comprising a cable for attachment to said pulling means and retainer means on said cable for retaining one or more slider rings on said cable, wherein said retaining means is convertible between a retaining function whereby said retaining of the slider ring(s) is effected and a non-retaining function allowing said slider ring(s) to be removed from said cable. The retainer means may be convertible by movement between a retaining position in which said retaining of the slider ring(s) is effected and a non-retaining position in which the slider rings can be removed from the cable.

In a preferred embodiment, the retainer means comprises a stopper on said cable and a toggle which is retained on said cable by the stopper, wherein the stopper is dimensioned to allow the slider ring(s) to pass thereover for the removal or mounting of said slider ring(s) from or onto said cable and said toggle is dimensioned to retain said slider ring(s) against said stopper on said cable, the toggle further being movable into a position in which it is in alignment with said cable to permit said slider ring(s) to pass over the toggle in said aligned position for removal of said slider ring(s) from the cable.

According to another aspect of the invention, there is provided toggle apparatus for attachment to a tractor or other pulling means, comprising a main line cable for attachment to said pulling means, a stopper on said cable and a toggle which is retained on said cable by said stopper, wherein the stopper is dimensioned to allow the passage thereover of slider rings for the removal or mounting of said slider rings from or onto said cable and said toggle is dimensioned to retain said slider rings against said stopper on said cable, the toggle further being movable into a position in which it is in alignment with said cable to permit said slider rings to pass over the toggle in said aligned position for removal of said slider rings from said cable.

BRIEF DESCRIPTION OF THE DRAWINGS

The invention will now be described by way of an example with reference to the accompanying drawings, in which.

DETAILED DESCRIPTION OF PREFERRED EMBODIMENT

Figure 1:
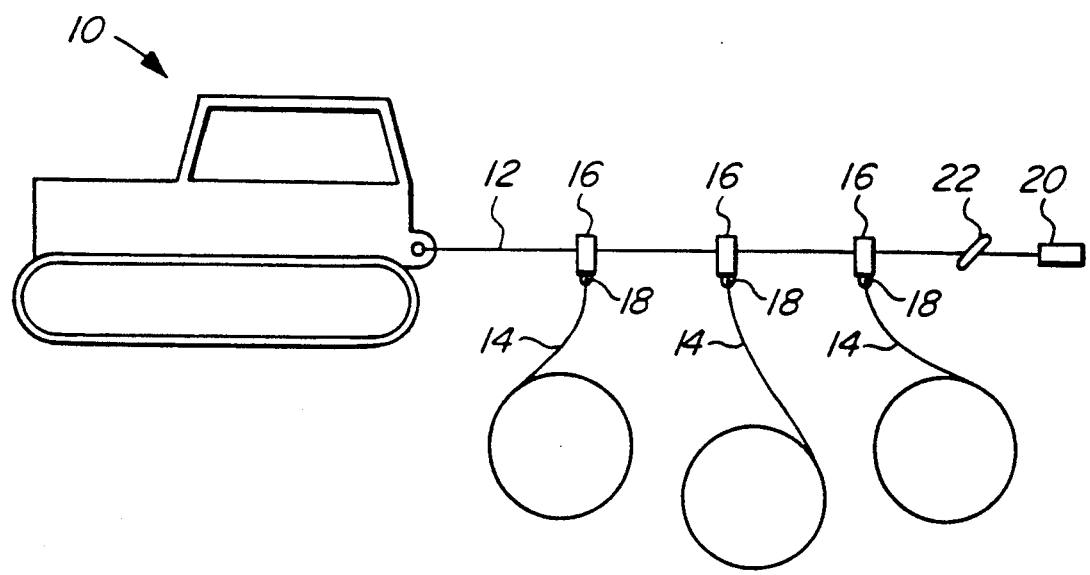
FIG. 1 is a schematical representation of a tractor to which is attached a main line cable with a plurality of choker cables attached to the main line cable and including a toggle and a retainer knob on the cable.
Figure 2:
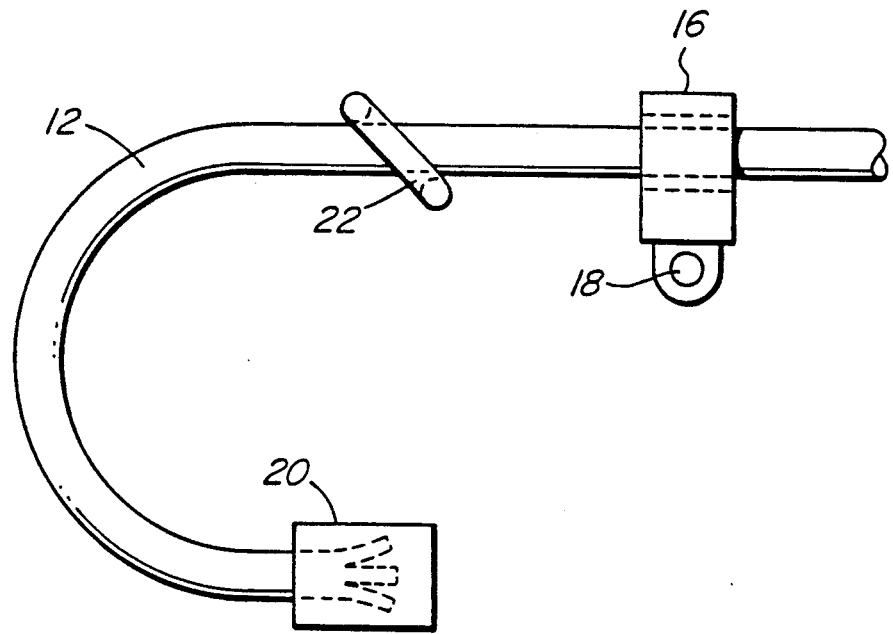
FIG. 2 is a fractional view, on a larger scale, of the rear end of the main line cable showing the toggle, the retainer knob and one choker cable.

In FIG. 1 reference numeral 10 generally indicates a tractor to the rear end of which is attached a main line cable 12. A plurality of choker cables 14 is attached to the main line 12 by means of slider rings 16. Each slider ring 16 has an eye 18 to which the choker cable 14 is spliced.

A retainer knob 20 is attached to the rear end of the main line 12 by means of wedges, or in any other suitable fashion, and a toggle 22 is located between the rearmost slider ring 16 and the knob 20. The knob 20 is cylindrical in shape and it has an outer diameter which is less than the inner diameter of the slider rings 16 so that the slider rings 16 can slide over the knob 20.

The toggle 22 has an elongated shape and it has an opening which is smaller than the outer diameter of the knob 20 so that the toggle 22 is retained on the main line 12 by means of the toggle 22. The toggle 22 further has an outside dimension such that when the toggle 22 is loose on the main line 12, the slider rings 16 cannot go over the toggle 22 so that the slider rings 16 are retained on the main line 12 by means of the toggle 22.

Figure 7:
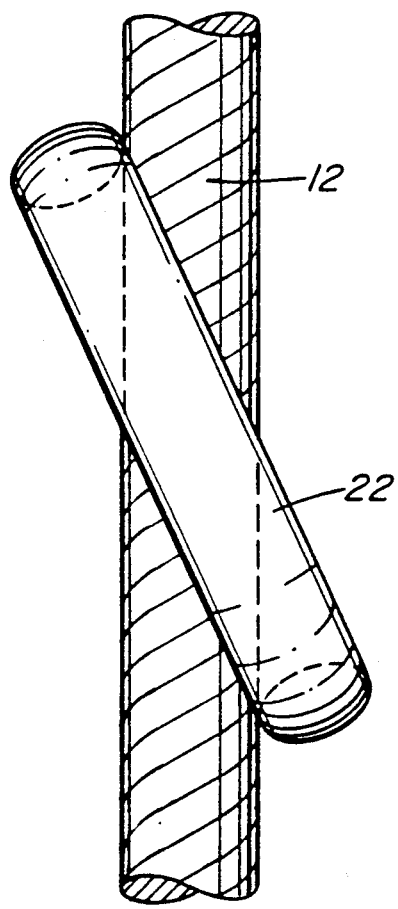
FIG. 7 is a side view of the toggle of FIG. 3 in a flattened or aligned position on the main line cable permitting the removal of a slider ring from the main line cable.

The dimension of the toggle 22 is such that when the toggle 22 is aligned or flattened against the main line cable 12, as shown in FIG. 7, and because of its elongate inside dimension, the slider rings 16 can pass over the outside dimension of the toggle 22 which, in the aligned position, is smaller than the inside diameter of the slider rings 16.

The slider rings 16 are conveniently conventional sliders of 1.65 inches inside diameter and thus the retainer knob 20 will be of a reduced size compared with conventional retainer knobs.

Figure 3:
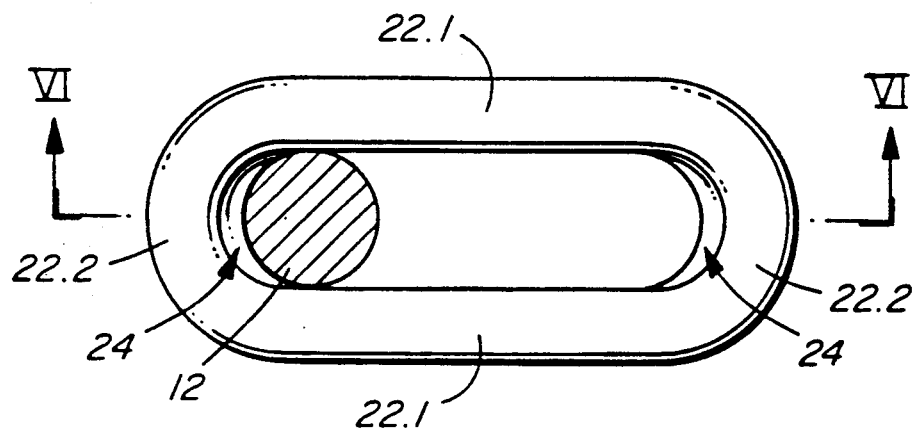
FIG. 3 is a plan view of the main line toggle according to the invention.
Figure 4:
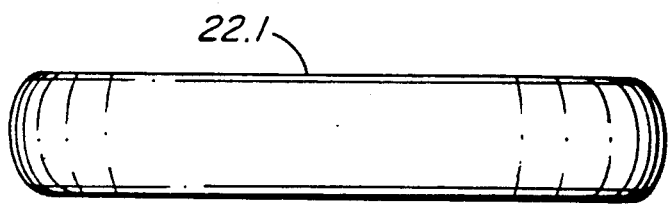
FIG. 4 is a side view of the toggle of FIG. 3.
Figure 5:
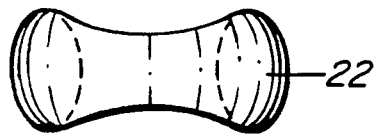
FIG. 5 is an end view of the toggle of FIG. 3.
Figure 6:
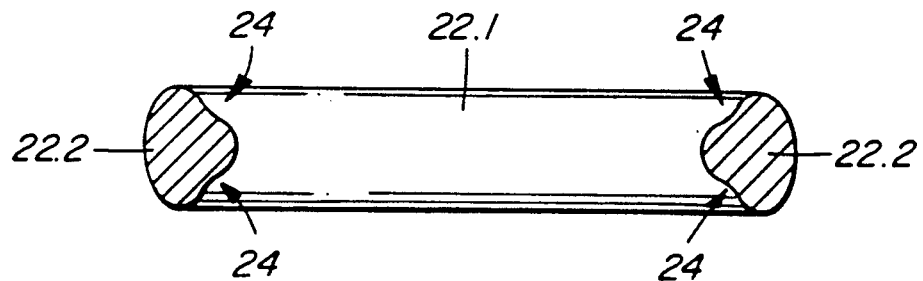
FIG. 6 is a section taken along the lines VI—VI in FIG. 3.

As shown in FIG. 3, the toggle 22, preferably has a pair of elongate sides 22.1 and a pair of rounded ends 22.2, the inside curvature of the ends 22.2 corresponding substantially with the curvature of the main line cable 12. The rounded ends 22.2 are preferably further recessed, as shown at 24 in FIGS. 3 and 6, to partially receive the body of the main line cable 12 when the toggle 22 is flattened lengthwise against the main line 12, as shown in FIG. 7. This facilitates in permitting the slider rings 16 to pass over the toggle 22 when it is in the flattened or aligned position.

The toggle 22 is preferably of metal. Outside dimensions of approximately 1.56 inches wide, 3.5 inches long and 0.7 inches thick and inside dimensions of approximately 2.5 inches long and 0.7 inches wide have been found to be suitable. However, these dimensions will vary with main and slider ring diameters.

OPERATION

In operation, an operator will thread a toggle 22 onto the main line cable 12 and, thereafter, attach the retainer knob 20 to the main line 12 using the known technique of a wedged clamp. The slider rings 16, however, instead of being mounted prior to the retainer knob 20 being attached to the main line 12, as was done previously, can readily pass over the knob 20 and by flattening the toggle 22 against the main line cable 12, the slider rings 16 are passed over the toggle 22. When the toggle 22 is released to hang loosely on the main line 12, it acts as a retainer for the slider rings 16 on the main line 12.

Thus, it is very easy to mount and remove the slider rings 16 and their attached choker cables 14 which results in less down time for the log operation and less dangerous conditions since a broken choker cable and its attached slider ring can be readily removed from the main line 12. When a choker cable breaks, the corresponding slider ring can be easily removed and replaced with another slider ring with cable attached. Thus, there is no down time for the attachment of choker cables to the slider rings. Attachment takes place when the slider ring is removed from the main line.

What is claimed is:

1. Logging apparatus for attachment to a tractor or other pulling means, comprising a main line cable for attachment to said pulling means at a leading end of said main line cable and a retainer at a trailing end of said main line cable, a choker cable slider ring on said main line cable, said slider ring being capable of passing over said retainer and a toggle on said main line cable between said retainer and said slider ring, said toggle comprising a non-cylindrical annular member of elongate shape and having a central opening, through which said main line cable is threaded, which central opening is elongate in cross section, said toggle being held captive on said main line cable by said retainer, the toggle being dimensioned so that it permits the passage of said slider ring when the toggle is held in a position in which it is substantially in alignment with the main line cable and prevents the passage of the slider ring when released from said position of alignment.

2. Logging apparatus for attachment to a tractor or other pulling means, comprising a main line cable for attachment to said pulling means at a leading end of said main line cable and a retainer at a trailing end of said main line cable, a choker cable slider ring on said main line cable, said slider ring being capable of passing over said retainer and a toggle on said main line cable between said retainer and said slider ring, said toggle comprising an annular member of elongate shape and having a central opening, through which said main line cable is threaded, which central opening is elongate in cross section, said toggle being held captive on said main line cable by said retainer, the toggle being dimensioned so that it permits the passage of said slider ring when the toggle is held in a position in which it is substantially in alignment with the main line cable and prevents the passage of the slider ring when released from said position of alignment, wherein the toggle has a pair of elongate slides and a pair of rounded ends, the rounded ends each having an inside curvature and the main line cable having an outside curvature, and wherein the inside curvature of each of said rounded ends corresponds substantially with the outside curvature of the main line cable.

3. The logging apparatus according to claim 2, wherein said rounded ends are provided with recesses to partially receive the main line cable when the toggle is in said aligned position.

* * * * *